United States Patent
Yoo et al.

(10) Patent No.: US 10,476,580 B2
(45) Date of Patent: Nov. 12, 2019

(54) HIGH SPEED PHASE SHIFT KEYING MODULATOR

(71) Applicant: GENOHCO INC., Anyang-si (KR)

(72) Inventors: Tae Sam Yoo, Seoul (KR); Ho Jik Lee, Seoul (KR)

(73) Assignee: Genohco Inc., Anyang-si (KR)

( * ) Notice: Subject to any disclaimer, the term of this patent is extended or adjusted under 35 U.S.C. 154(b) by 0 days.

(21) Appl. No.: 15/855,272

(22) Filed: Dec. 27, 2017

(65) Prior Publication Data

US 2018/0191425 A1    Jul. 5, 2018

(30) Foreign Application Priority Data

Dec. 27, 2016 (KR) .......... 10-2016-0180134

(51) Int. Cl.
| | |
|---|---|
| H04B 7/185 | (2006.01) |
| H04H 60/15 | (2008.01) |
| H04B 7/06 | (2006.01) |
| H04L 27/20 | (2006.01) |
| H04L 5/00 | (2006.01) |

(52) U.S. Cl.
CPC ........... *H04B 7/185* (2013.01); *H04B 7/0678* (2013.01); *H04H 60/15* (2013.01); *H04L 5/0048* (2013.01); *H04L 27/20* (2013.01); *H04L 27/2064* (2013.01)

(58) Field of Classification Search
CPC ........ H04H 20/76; H04H 60/37; H04H 20/30; H04H 20/63; H04H 20/74; H04H 40/27; H04H 60/15; H04H 60/39; H04H 60/85
USPC .......................................... 375/148; 370/265
See application file for complete search history.

(56) References Cited

U.S. PATENT DOCUMENTS

| | | | |
|---|---|---|---|
| 9,432,107 B2 | 8/2016 | Kim | |
| 2003/0112370 A1* | 6/2003 | Long | H04N 7/08 348/474 |
| 2007/0156799 A1* | 7/2007 | Gilbert | H03H 17/06 708/300 |
| 2007/0288988 A1* | 12/2007 | Van Rees | H04L 27/34 725/149 |
| 2008/0043861 A1 | 2/2008 | Moffatt | |
| 2011/0150124 A1 | 6/2011 | Kim et al. | |
| 2012/0141130 A1* | 6/2012 | Nakashima | H04B 10/505 398/82 |

(Continued)

FOREIGN PATENT DOCUMENTS

| | | |
|---|---|---|
| KR | 10-2011-0069500 A | 6/2011 |
| KR | 10-1057568 B | 8/2011 |

(Continued)

OTHER PUBLICATIONS

Korean Office Action dated Oct. 2, 2018 in counterpart Korean Patent Application No. 10-2016-0180134. (5 pages in Korean).

(Continued)

*Primary Examiner* — David C Payne
*Assistant Examiner* — Sarah Hassan
(74) *Attorney, Agent, or Firm* — NSIP Law

(57) ABSTRACT

Provided is a high speed phase shift keying modulator. The high speed phase shift keying modulator has variable pipeline buffers formed at an input side and an output side of a bandlimiting filter and a compensation filter to ensure timing margins of the bandlimiting filter and the compensation filter, so that a ultra-high speed phase shift keying modulator is provided.

2 Claims, 3 Drawing Sheets

(56) References Cited

U.S. PATENT DOCUMENTS

2012/0177141 A1 7/2012 Oh et al.
2015/0146822 A1 5/2015 Copeland

FOREIGN PATENT DOCUMENTS

| KR | 10-2016-0053562 A | 5/2016 |
| KR | 10-2016-0091945 A | 8/2016 |
| WO | WO 2016/012382 A1 | 1/2016 |

OTHER PUBLICATIONS

Extended European Search Report dated May 30, 2018, in corresponding European Application No. 17210665.0 (5 pages, in English).
Korean Office Action dated May 1, 2019 in corresponding Korean Patent Application No. 10-2016-0180134 (6 pages in Korean).

* cited by examiner

HIGH SPEED PHASE SHIFT KEYING MODULATOR

CROSS-REFERENCE TO RELATED APPLICATION

This application claims priority to and the benefit of Korean Patent Application No. 10-2016-0180134, filed on Dec. 27, 2016, the disclosure of which is incorporated herein by reference in its entirety.

BACKGROUND

1. Field of the Disclosure

The present disclosure relates to a phase shift keying modulator, and more particularly, to a structure of a high speed phase shift keying modulator based on a phase modulation scheme which is used in a low earth orbit, middle earth orbit, geostationary orbit, and deep space satellite.

2. Discussion of Related Art

FIG. 1 is a block diagram illustrating a configuration of a general phase shift keying modulator. Referring to FIG. 1, the general phase shift keying modulator includes a mapper, a bandlimiting filter, a compensation filter, and a digital-analog converter (DAC). In order to limit a band of a digital constellation signal mapped by the mapper and remove intersymbol interference, a bandlimiting filter is used. A square root raised cosine (SRRC) filter is used as a bandlimiting filter. At frequencies near a Nyquist frequency, band limited symbol signals have signal attenuation, and in-band signal attenuation occurs. In order to compensate for such signal attenuation, a compensation filter with 1/Sinc properties is used to compensate the attenuated signal, and the compensated signal is transferred to the DAC so that the signal is converted into an analog signal.

The digital signal mapped by the mapper passes through the bandlimiting filter and the compensation filter and finally through the DAC to be converted into the analog signal and output. In order to process a high speed signal, each block needs to ensure a proper clock timing margin.

In detail, the bandlimiting filter and the compensation filter each need to have a sampling frequency four times greater than that of the mapper. For example, when constructing a 240 Msps (Mega samples per second) phase shift keying modulator, an output of the mapper has an in-phase component of 120 Msps and a quadrature component of 120 Msps. Accordingly, the sampling frequency of the bandlimiting filter and the compensation filter is set to 480 MHz, which is four times greater than that of the mapper.

As for a phase shift keying modulator implemented using a field programmable gate array (FPGA), when a circuit synthesis and automatic placement and routing (P&R) are coded using a resistor transfer level (RTL), a logic delay caused by each high frequency stage ends up making it difficult to ensure the clocking timing margin. Accordingly, it is impossible to implement a high speed phase shift keying modulator using a FPGA.

RELATED ART DOCUMENT

Patent Document (Patent Document 1) Korea Patent Unexamined Publication No. 10-2016-0053562

SUMMARY OF THE DISCLOSURE

The present disclosure is directed to a new structure of a phase shift keying modulator in which the phase shift keying modulator is implemented using a field programmable gate array (FPGA).

The technical objectives of the present disclosure are not limited to the above, and other objectives may become apparent to those of ordinary skill in the art based on the following descriptions.

A high speed phase shift keying modulator according to the present disclosure has pipeline buffers added at an input side and an output side of a bandlimiting filter and a compensation filter. The pipeline buffers allow timing margins to be ensured.

According to one aspect of the present disclosure, there is provided a high speed phase shift keying modulator including a mapper, a first pipeline buffer, a second pipeline buffer, a first square root raised cosine (SRRC) filter, a second SRRC filter, a third pipeline buffer, a fourth pipeline buffer, a first compensation filter, a second compensation filter, a first DAC, and a second DAC. The mapper may be configured to map a signal to modulating symbols representing a position according to an amplitude and a phase constellation. The first pipeline buffer may have an in-phase component of an output of the mapper as an input. The second pipeline buffer may have a quadrature phase component of the output of the mapper as an input. The first SRRC filter may have an output signal of the first pipeline buffer as an input. The second SRRC filter may have an output signal of the second pipeline buffer as an input. The third pipeline buffer may have an output signal of the first SRRC filter as an input. The fourth pipeline buffer may have an output signal of the second SRRC filter as an input. The first compensation filter may have an output signal of the third pipeline buffer as an input and may be configured to compensate for signal distortion. The second compensation filter may have an output signal of the fourth pipeline buffer as an input and may be configured to compensate for signal distortion. The first DAC may have an output signal of the first compensation filter as an input. The second DAC may have an output signal of the second compensation filter as an input.

The bandlimiting filter and the compensation filter of the high speed phase shift keying modulator may be implemented by using a digital signal processing (DSP) block in a FPGA.

The first and second SRRC filters and/or the first and second compensation filters may be implemented in the DSP unit in the FPGA by software.

Each of the first SRRC filter and the second SRRC filter of the high speed phase shift keying modulator may include an odd number portion finite impulse response filter, an even number portion finite impulse response filter, and a summator. The odd number portion finite impulse response filter may be configured to process an odd number component of an input signal. The even number portion finite impulse response filter may be configured to process an even number component of the input signal. The summator may be configured to summate outputs of the odd number portion finite impulse response filter and the even number portion finite impulse response filter, and to output a result of the summation.

The first to fourth pipeline buffers may have a pipeline state value which is determined with reference to a slack value of a slack report generated after automatic placement and routing (P&R).

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
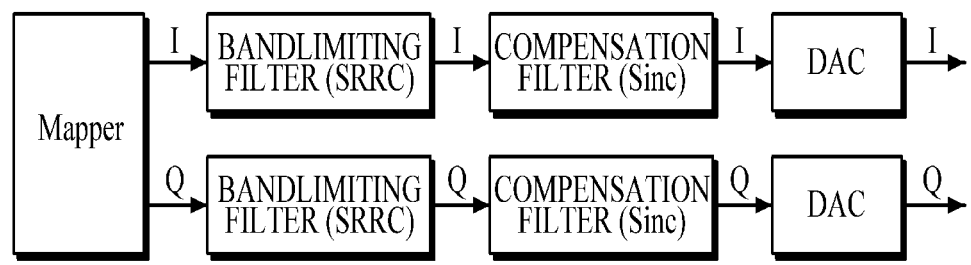
FIG. 1 is a block diagram illustrating a configuration of a general phase shift keying modulator.

Hereinafter, a high speed phase shift keying modulator 200 according to exemplary embodiments will be described in detail below with reference to the accompanying drawings. In the descriptions, the same reference numerals are used to designate the same elements, and details of redundant descriptions and related known functions or constructions will be omitted to avoid obscuring the subject matter of the present disclosure. The embodiments are provided so that this disclosure is complete and fully conveys the inventive concept to those skilled in the art. Accordingly, the shape and size of each component shown in the drawings can be exaggerated for clarity of explanation.

Figure 2:
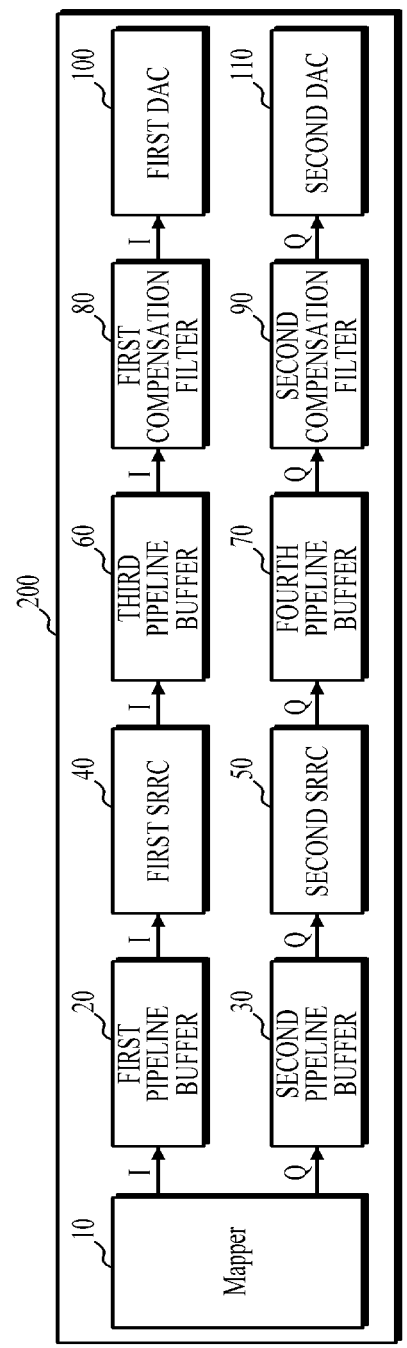
FIG. 2 is a block diagram illustrating a configuration of a high speed phase shift keying modulator according to an embodiment.

FIG. 2 is a block diagram illustrating a configuration of the high speed phase shift keying modulator 200 according to an embodiment.

Referring to FIG. 2, the high speed phase shift keying modulator 200 according to an embodiment includes a mapper 10, a first pipeline buffer 20, a second pipeline buffer 30, a first square root raised cosine (SRRC) filter 40, a second SRRC filter 50, a third pipeline buffer 60, a fourth pipeline buffer 70, a first compensation filter 80, a second compensation filter 90, a first DAC 100, and a second DAC 110. The mapper 10 is configured to map a signal to modulating symbols representing a position according to an amplitude and a phase constellation. The first pipeline buffer 20 has an in-phase component of an output of the mapper 10 as an input. The second pipeline buffer 30 has a quadrature phase component of the output of the mapper 10 as an input. The first SRRC filter 40 has an output signal of the first pipeline buffer 20 as an input. The second SRRC filter 50 has an output signal of the second pipeline buffer 30 as an input. The third pipeline buffer 60 has an output signal of the first SRRC filter 40 as an input. The fourth pipeline buffer 70 has an output signal of the second SRRC filter 50 as an input. The first compensation filter 80 has an output signal of the third pipeline buffer 60 as an input and is configured to compensate for signal distortion. The second compensation filter 90 has an output signal of the fourth pipeline buffer 70 as an input and is configured to compensate for signal distortion. The first DAC 100 has an output signal of the first compensation filter 80 as an input. The second DAC 110 has an output signal of the second compensation filter 90 as an input.

The reason for using the first to fourth pipeline buffers 20, 30, 60 and 70 are as follows. The SRRC filter and the compensation filter of the phase shift keying modulator each employ filter coefficients with eighty taps according to an aspect of the embodiment, and thus a logic delay inherently occurs. When an output signal of the SRRC filter is directly transferred to the compensation filter, clock margins are not ensured due to the logic delay, and thus a high speed phase shift keying modulator is not constructed. Accordingly, the high speed phase shift keying modulator 200 according to an embodiment includes the first to fourth pipeline buffers 20, 30, 60 and 70 between the mapper 10 and the first SRRC filter 40, between the mapper 10 and the second SRRC filter 50, between the first SRRC filter 40 and the first compensation filter 80, and between the second SRRC filter 50 and the second compensation filter 90, respectively, which compensates for the insufficient clock margin occurring due to the logic delay generated in the SRRC filter and the compensation filter so that clock margins between the blocks are ensured, thus enabling high speed operation of the phase shift keying modulator.

Meanwhile, the high speed phase shift keying modulator 200 according to an embodiment may be implemented using a field programmable gate array (FPGA). FPGA is a well-known technology classified as a high density Programmable Logic Device (PLD) and enables a desired circuit to be rapidly implemented by user programming which utilizes an electrical fuse.

The first SRRC filter 40, the second SRRC filter 50, the first compensation filter 80, and the second compensation filter 90 of the high speed phase shift keying modulator 200 according to an embodiment may be implemented in a digital signal processing (DSP) unit inside the FPGA by software.

In an automatic placement and routing (P&R) operation which is implemented by the FPGA, the high speed phase shift keying modulator 200 according to an embodiment senses a pipeline state of each of the pipeline buffers using a P&R tool, and when it is determined that the timing margins have been ensured, in a logic optimization process, the DSP unit may construct the bandlimiting filter and the compensation filter as software so that a high speed filter may be constructed. Accordingly, a high speed phase shift keying modulator may be constructed. For example, with a Xilinx Kintex-7 FPGA, a filter with a sample rate of 480 MHz may be constructed, and when 8 PSK modulation with 240 Msps is used, a ultra-high speed phase shift keying modulator with a data rate of about 720 mbps may be constructed.

Figure 3:
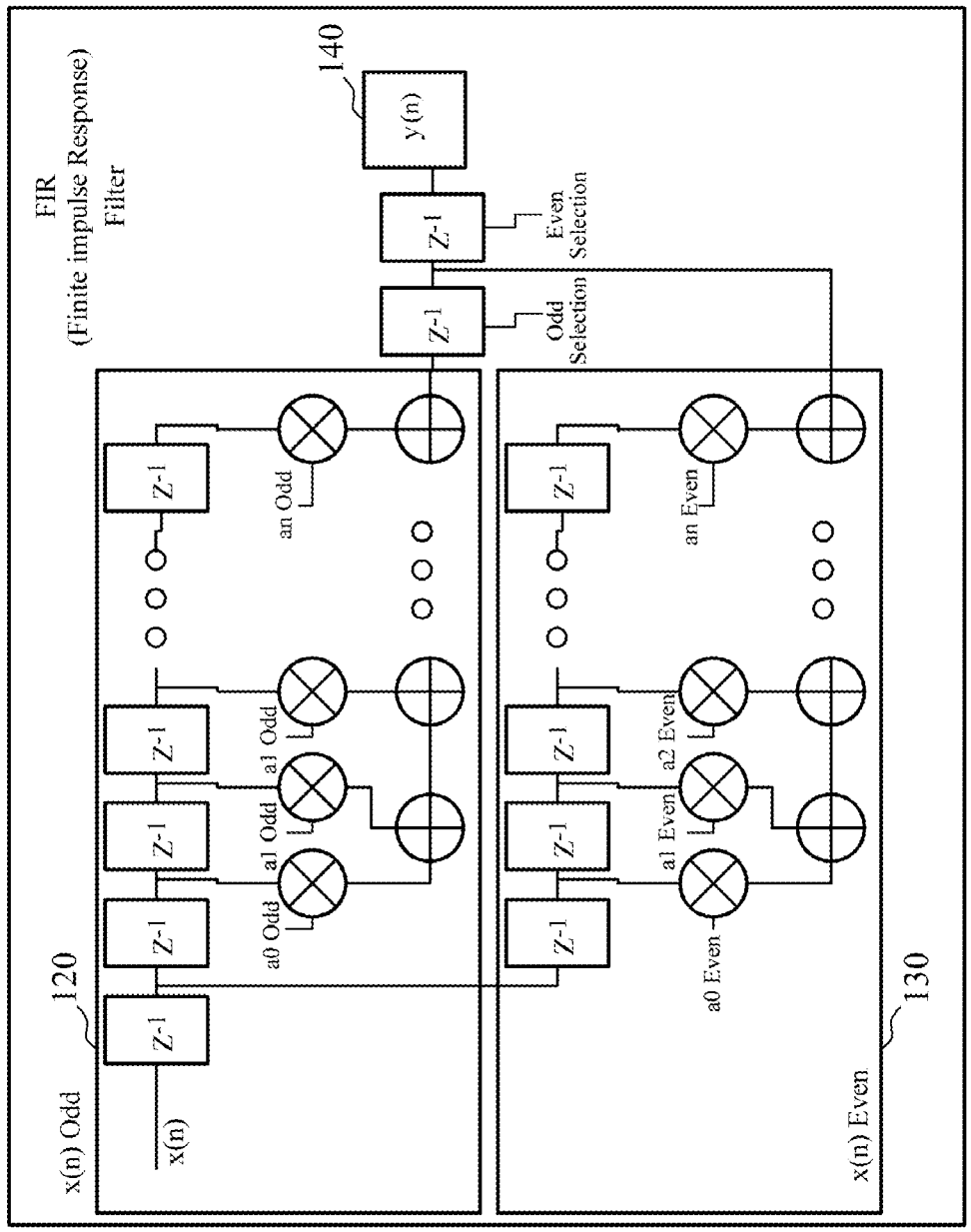
FIG. 3 is a circuit diagram illustrating a configuration of a first square root raised cosine (SRRC) filter or a second SRRC filter of a high speed phase shift keying modulator according to an embodiment.

FIG. 3 is a circuit diagram illustrating a configuration of the first SRRC filter 40 or the second SRRC filter 50 of the high speed phase shift keying modulator 200 according to an embodiment.

Referring to FIG. 3, each of the first SRRC filter 40 and the second SRRC filter 50 includes an odd number portion finite impulse response (FIR) filter 120, an even number portion FIR filter 130, and a summator 140. The odd number portion FIR filter 120 may be configured to process an odd number component of an input signal. The even number portion FIR filter 130 may be configured to process an even number component of the input signal. The summator 140 may be configured to summate outputs of the odd number portion FIR filter 120 and the even number portion FIR filter 130, and to output a result of the summation. In FIG. 3, x(n) Odd corresponds to the odd number portion FIR filter 120, and x(n) Even corresponds to the even number portion FIR filter 130. Also, y(n) corresponds to the summator 140.

Meanwhile, the SRRC filter of the high speed phase shift keying modulator 200 according to an embodiment as shown in FIG. 3 may be implemented as a FIR filter having eighty taps. According to an aspect of the embodiment, the first compensation filter 80 and the second compensation filter 90 may be an inverse Sinc filter, which is a type of FIR filter and thus similar to the SRRC filter, and may be implemented as a FIR filter having eighty taps and include an odd number portion FIR filter 120, an even number portion FIR filter 130, and a summator 140 as shown in FIG. 3.

With respect to the high speed phase shift keying modulator 200 according to an embodiment, the first to fourth pipeline buffers 20, 30, 60, and 70 may have a pipeline state which varies with reference to a slack of a slack report generated after P&R.

That is, the high speed phase shift keying modulator 200 may adjust, by referring to a slack record of a timing report among reports generated after P&R by a FPGA tool, the pipeline state until a desired slack for each of the first to fourth pipeline buffers 20, 30, 60, and 70 is obtained so that the clock margin is ensured. A slack represents an absolute time interval between a time at which data actually arrives and an earliest boundary of a setup time interval. The setup time interval is an interval in the amount of a setup time requirement before a rising edge or a falling edge of a preset clock in a system. Accordingly, the pipeline state may be adjusted with reference to the slack.

As should be apparent from the above, a high speed phase shift keying modulator can be implemented using an FPGA.

When the high speed phase shift keying modulator is equipped in a satellite, data can be transmitted to a terrestrial station at high speed, and in particular, high-speed data transmission using a low-earth orbit satellite can be enabled.

In addition, a high-speed filter is constructed so that the cost of the phase shift keying modulator can be significantly reduced and the reliability of a satellite's critical mission can be ensured.

Although exemplary embodiments of the present disclosure have been described in the specification and the accompanying drawings, the exemplary embodiments are intended to not limit the technical spirit of the present disclosure, and those skilled in the art should appreciate that various substitutions, modifications, and changes are possible without departing from the scope and spirit of the disclosure. Therefore, the scope of the disclosure is not to be limited by the above embodiments but by the claims and the equivalents thereof.

What is claimed is:

1. A high speed phase shift keying modulator, comprising:
   a mapper configured to map a signal to modulating symbols representing a position according to an amplitude and a phase constellation;
   a first pipeline buffer having an in-phase component of an output of the mapper as an input;
   a second pipeline buffer having a quadrature phase component of the output of the mapper as an input;
   a first square root raised cosine (SRRC) filter having an output signal of the first pipeline buffer as an input;
   a second SRRC filter having an output signal of the second pipeline buffer as an input;
   a third pipeline buffer having an output signal of the first SRRC filter as an input;
   a fourth pipeline buffer having an output signal of the second SRRC filter as an input;
   a first compensation filter having an output signal of the third pipeline buffer as an input, and configured to compensate for signal distortion;
   a second compensation filter having an output signal of the fourth pipeline buffer as an input, and configured to compensate for signal distortion;
   a first digital-analog converter (DAC) having an output signal of the first compensation filter as an input; and
   a second DAC having an output signal of the second compensation filter as an input,
   wherein each of the first SRRC filter and the second SRRC filter includes
      an odd number portion finite impulse response filter configured to process an odd number component of an input signal,
      an even number portion finite impulse response filter configured to process an even number component of the input signal, and
      a summator configured to summate outputs of the odd number portion finite impulse response filter and the even number portion finite impulse response filter, and to output a result of the summation,
   wherein the high speed phase shift keying modulator is implemented using a field programmable gate array (FPGA), and
   wherein the first to fourth pipeline buffers have a pipeline state value which is determined with reference to a slack value of a slack report generated after automatic placement and routing (P&R).

2. The high speed phase shift keying modulator of claim 1, wherein the first and second SRRC filters and/or the first and second compensation filters are implemented in a digital signal processing unit in the FPGA by software.

* * * * *